United States Patent [19]
Rokos et al.

[11] Patent Number: 5,149,197
[45] Date of Patent: Sep. 22, 1992

[54] PIEZO ELECTRIC RESONATOR TEMPERATURE SENSOR

[75] Inventors: George H. S. Rokos, Bishop's Stortford; Peter E. Morley, Rayne, both of United Kingdom

[73] Assignee: Northern Telecom Limited, Montreal, Canada

[21] Appl. No.: 706,216

[22] Filed: May 28, 1991

[30] Foreign Application Priority Data

Jun. 12, 1990 [GB] United Kingdom ............... 9013056

[51] Int. Cl.⁵ ........................................... G01K 11/22
[52] U.S. Cl. ..................................... 374/117; 374/163; 310/311; 310/371; 331/66; 331/163; 73/579
[58] Field of Search ............ 310/311, 361, 315, 365, 310/318, 366, 320, 371, 321; 73/579; 331/66, 155, 158, 163; 374/117, 163, 170

[56] References Cited

U.S. PATENT DOCUMENTS

| | | | |
|---|---|---|---|
| 4,468,634 | 8/1984 | Takagi et al. | 374/163 X |
| 4,472,656 | 9/1984 | Franx | 374/117 X |
| 4,481,488 | 11/1984 | Dworsky | 331/163 X |
| 4,537,515 | 8/1985 | Dinger et al. | 331/66 X |
| 4,558,248 | 12/1985 | Valentin | 374/117 X |
| 4,625,138 | 11/1986 | Ballato | 310/320 |
| 4,628,285 | 12/1986 | Nakatani et al. | 331/163 |
| 4,872,765 | 10/1989 | Schodowski | 374/117 |
| 4,939,403 | 7/1990 | Kittaka et al. | 310/320 |

FOREIGN PATENT DOCUMENTS 1525488 11/1989 U.S.S.R. ........................ 374/117

Primary Examiner—William A. Cuchlinski, Jr.
Assistant Examiner—G. Bradley Bennett
Attorney, Agent, or Firm—Lee, Mann, Smith, McWilliams, Sweeney & Ohlson

[57] ABSTRACT

The temperature of a quartz crystal oscillator is determined by comparison of a pair of inharmonically related overtone oscillations of the same vibrational type, e.g. a thickness shear mode, and of the same overtone order. The use of inharmonically related signals relaxes the constraints on crystal design. The technique may be employed in a crystal controlled frequency synthesizer to provide a feedback signal for maintaining constant output frequency.

6 Claims, 4 Drawing Sheets

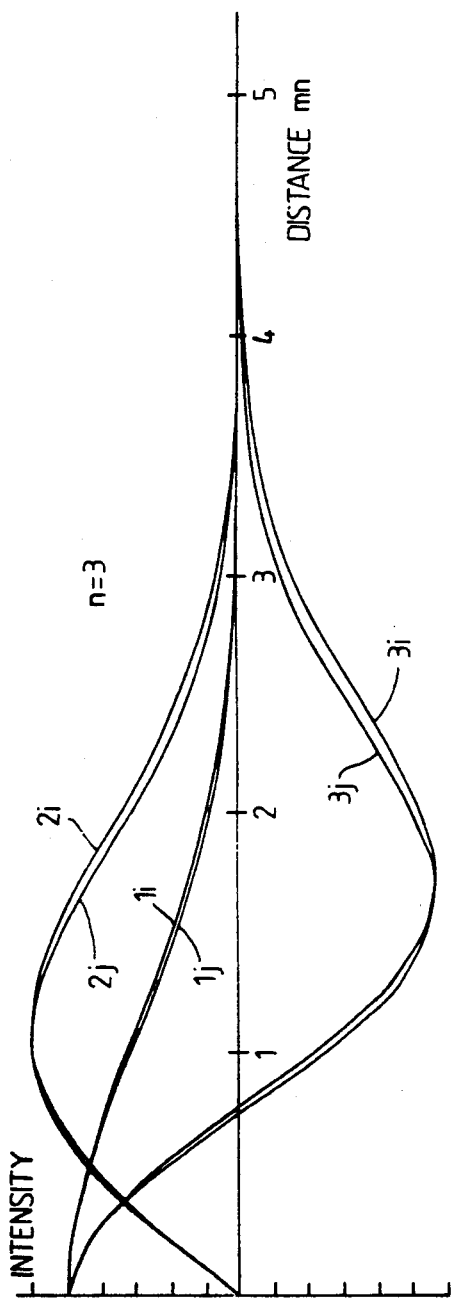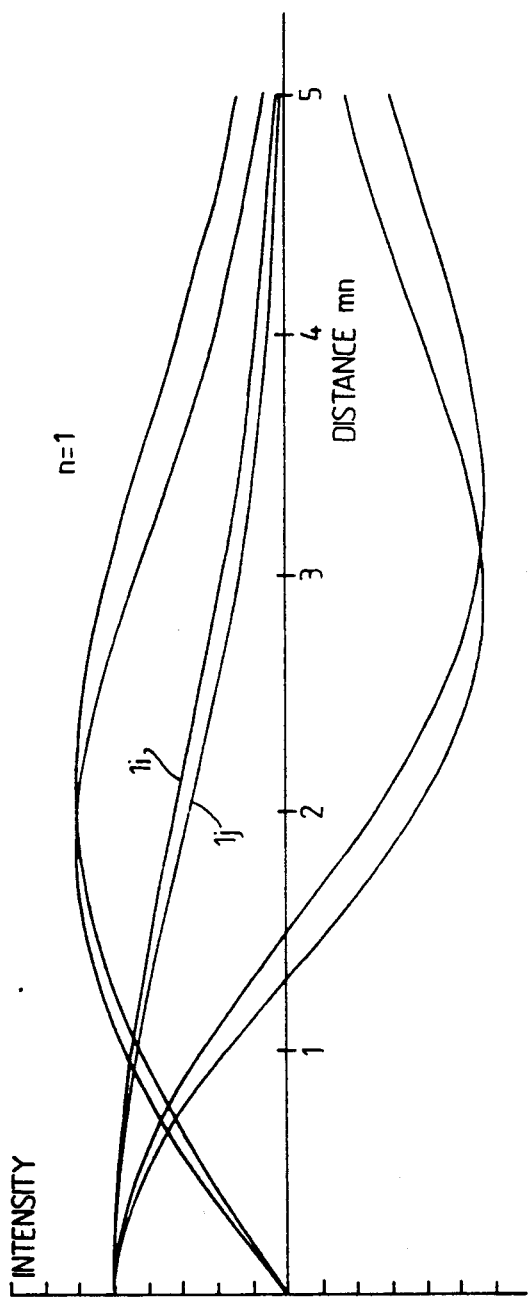

PIEZO ELECTRIC RESONATOR TEMPERATURE SENSOR

FIELD OF THE INVENTION

This invention relates to temperature measurement, and in particular to a method and apparatus for determining the temperature of a piezo-electric crystal oscillator.

BACKGROUND OF THE INVENTION

Piezo-electric, e.g.quartz crystal, oscillators or resonators are widely used as frequency standards, e.g.for frequency synthesis applications. Whilst the frequency response of a quartz device to temperature changes is relatively small, it is significant in close tolerance applications and must therefore be compensated for by the derivation of an error signal. A preferred approach to this problem is to employ the quartz crystal itself as a temperature sensor. It has been found that some harmonics have a larger frequency response to temperature than others.

One approach to the problem is described for example in U.S. Pat. No. 4,872,765. In this arrangement the correction signal is derived from a signal which is equal to $mF_n - n F_m$ where $F_n$ is the nth harmonic frequency and $F_m$ is the (lower frequency) mth harmonic. This approach suffers from the disadvantage that the relatively large differences between the vibrating areas of the overtone frequencies imposes very severe constraints on the design of a compact crystal which is to provide good performance at the different harmonic frequencies. For example, if the vibrations of a 3.3 MHz fundamental frequency of a 10 um diameter SC-cut crystal are to be confined to the centre of the device in order to avoid unwanted interactions with flexural modes, a surface contour of about 7 dioptre is required. Such a high degree of surface curvature results e.g. in the third overtone mode being excessively sensitive to the effects of small surface irregularities resulting in interaction with flexural modes.

A further approach is to employ harmonics of two different modal classes. This technique is described for example in U.S. Pat. No. 4,468,634 which teaches the use of a tuning fork resonator which vibrates in both a torsioned and a flexural mode. The frequency difference between these two modes is temperature sensitive and thus provides a measure of the crystal temperature. The technique however places severe constraints on the resonator design. Other workers have proposed the use of a B-mode harmonic together with a C-mode harmonic. This can in principle provide accurate temperature measurement. However, it has been found, in crystal cuts where the C-mode is relatively stable, that it is almost impossible to avoid completely coupling between the B-mode and flexural modes. Hence, at certain temperatures, the B-mode exhibits significant distortion in its temperature response. Further, the frequency of the B-mode oscillator has been found to be sensitive to stress associated with the rate of temperature change thus introducing further inaccuracy.

An object of the present invention is to minimise or to overcome these disadvantages.

A further object of the invention is to provide a piezoelectric resonator temperature sensor having a high accuracy and exhibiting stable operation.

SUMMARY OF THE INVENTION

According to the invention there is provided a method of determining the temperature of a piezo-electric resonator, the method including comparing first and second inharmonically related vibrations of the same vibrational type and overtone order and of similar frequency whereby to derive a signal indicative of the oscillator temperature.

According to another aspect of the invention there is provided a temperature compensated piezo-electric resonator, including means for exciting first and second inharmonically related vibrations of a thickness shear mode of the same vibrational type and overtone order and of similar frequency, and means for deriving by comparison of the inharmonic vibrations, a signal characteristic of the temperature of the resonator.

According to a further aspect of the invention there is provided a frequency synthesiser, including a piezoelectric resonator, means for deriving submultiples of the resonator frequency, means controlled by a synthesis algorithm for combining selected submultiple frequencies to provide an output synthesised frequency, means for exciting in said resonator first and second inharmonically related vibrations of a thickness shear mode of the same overtone order and of similar frequency, means for deriving, by comparison of the inharmonic vibrations, a signal corresponding to the temperature of the resonator, and means responsive to the temperature signal for adjusting the synthesis algorithm whereby to maintain the synthesised frequency at a constant value.

The two oscillations are referred to as inharmonically related signals. Typically the higher frequency exceeds the lower frequency by less than 5% and preferably by 2% or less. Specifically, neither frequency is a simple multiple of or a simple rational faction of the other. Because the inharmonic signals are of similar frequency and vibrational type, the effects e.g. of mode trapping are similar so that a compact crystal design can provide good performance in both inharmonic modes. Further, the selection between the modes can be determined by the use of appropriate electrode structures and by controlling the driving phase of the oscillation maintaining amplifier thus eliminating problems arising from the use of different frequency selective elements. In addition, as the inharmonic vibrations are closely spaced in frequency and of similar type, they will be similarly affected by radiation and other environmental constraints.

The technique is of particular application to temperature compensation of crystal oscillators using frequency synthesis techniques.

DESCRIPTION OF PREFERRED EMBODIMENT

An embodiment of the invention will now be described with reference to the accompanying drawings in which:

FIGS. 5 and 6 illustrate the spatial distribution of typical SC vibrational modes.

Figure 1:
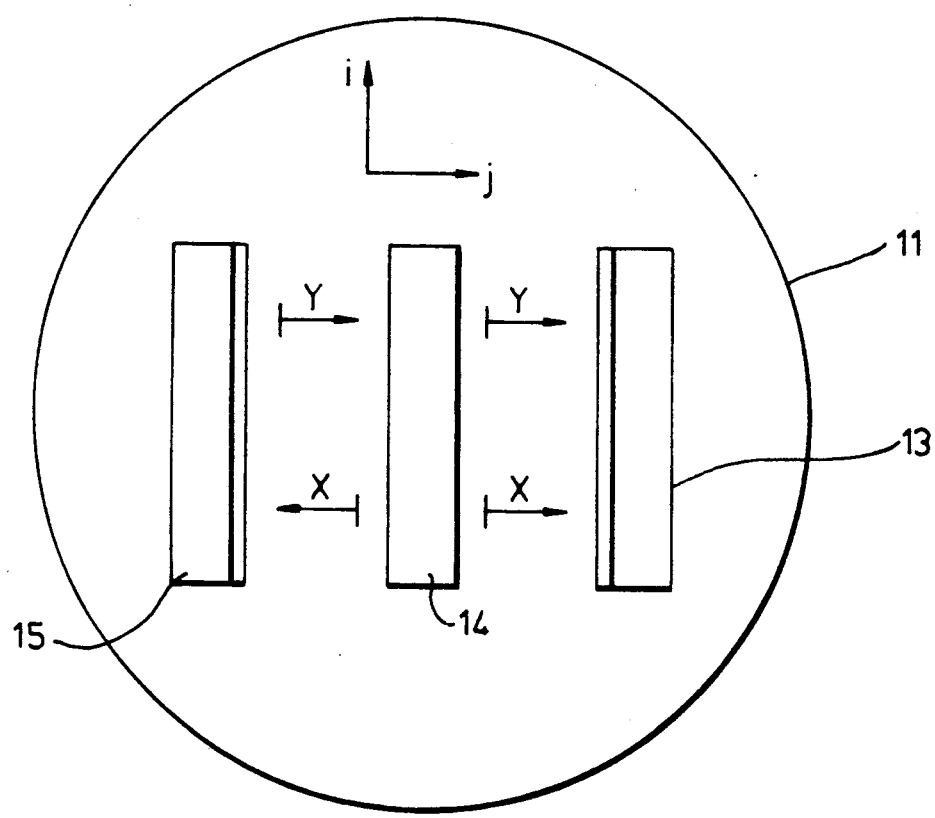
FIG. 1 is a part schematic plan view of a crystal resonator adapted to oscillate in a pair of oscillatory modes and provided with electrodes.
Figure 2:
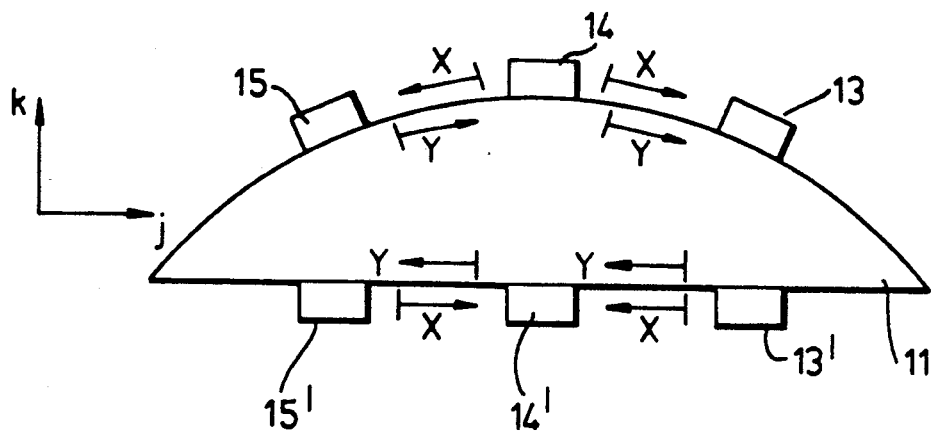
FIG. 2 is a cross-sectional view of the resonator of FIG. 1.

Referring to FIG. 1 and 2, the resonator comprises a generally lenticular quartz body 11 provided with metal, e.g. nichrome/gold, electrodes 13, 14 and 15. Preferably an SC-cut crystal is employed. As an aid to understanding the embodiment of FIGS. 1 and 2, mutually perpendicular vectors i, j, and k are shown defining three spatial reference directions. Other suitable crystal cuts include the AT and BT cuts. The crystal may be planar on one face, or may have both faces contoured.

The electrodes 13, 14 and 15 are so disposed on the resonator surface as to generate a pair of similar frequency C-mode oscillations generally indicated by the arrows X and Y. These arrows indicate the local displacements corresponding to the two harmonic modes at an instant in time for the (n, 2, 1) and (n, 1, 1) modes respectively. Preferably n is an odd integer Advantageously the vibrations are excited via an electrode structure which allows preferential coupling by different oscillators to different inharmonic modes thereby avoiding the requirement for narrow band frequency selection or trapping in the oscillation maintaining amplifier.

The electrode arrangement shown in FIGS. 1 and 2 is suitable for an SC cut crystal. For an AT cut crystal an electrode arrangement similar to that of a monolithic dual crystal filter would be more appropriate.

Figure 3:
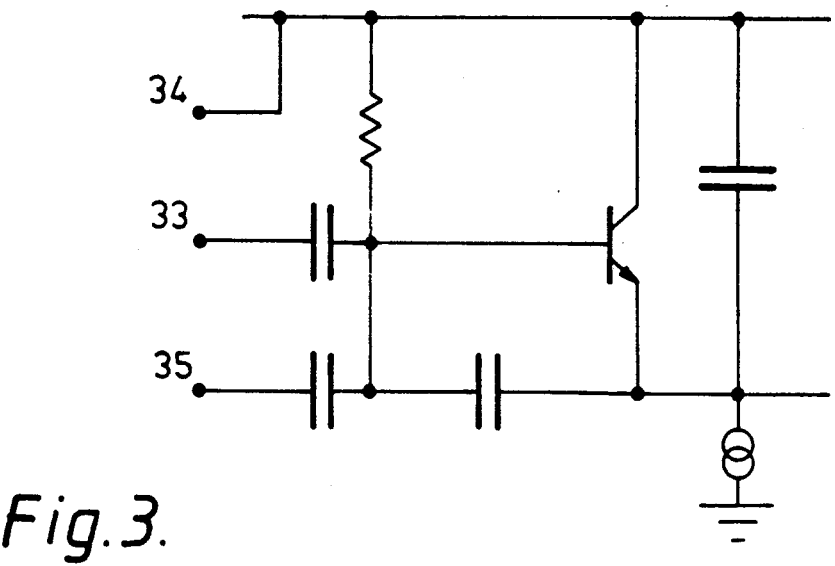
FIGS. 3 and 4 illustrate two forms of mode excitation circuits for use with the resonator of FIG. 1.

The modes are excited by the application of appropriate potentials to the electrodes. In an SC cut crystal, for example, application of an electric field between the outer electrodes 13 and 15, with the central electrode driven at a potential which is midway between the outer electrode potentials, will excite preferentially an (n,1,1) mode. A circuit for providing such potential conditions is shown in FIG. 3. The circuit outputs 33, 34 and 35 are coupled to the electrodes 13, 14 and 15 respectively.

Figure 4:
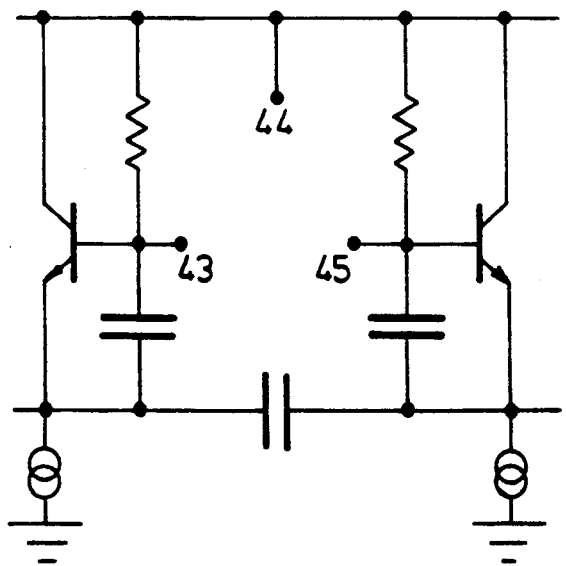

FIG. 4 shows an alternative circuit for exciting preferentially an (n,2,1) mode or an (n,1,2) mode, the particular mode being determined by the crystal orientation. This circuit applies identical potentials, via outputs 43 and 45 to electrodes 13 and 15 and applies further potentials, via output 44, to electrode 14.

The circuits of FIGS. 3 and 4 may be used simultaneously as each has only an insignificant effect on the other.

Clearly a wide range of harmonic modes is available, these modes being somewhat analogous to the various vibrational modes of a flat plate. The system of classifying these modes is defined below.

Each mode is defined by a three digit characteristic of the form (n, a, b) wherein:

n is the overtone number, i.e. the number of nodes along the direction k of FIG. 1 a is the number of anti-nodes along the direction j of FIG. 1); and b is the number of anti-nodes in a direction perpendicular to that of the directions j and k, i.e. the direction i of FIG. 1.

Typically we employ an (n, 1, 1) overtone together with any one of the (n, 2, 1), the (n, 1, 2) or the (n, 2, 2) overtones. The value of n is an integer, including unity. Typically we employ third overtone oscillations or vibrations for which n=3.

FIGS. 5 and 6 illustrate the spatial distribution of the amplitudes of vibrational inharmonic modes for a 4 dioptre crystal element. The curves show the spatial distribution of the inharmonic vibrations relative to the distance from the crystal centre along the i and j directions defined above.

FIG. 5 illustrates the amplitude or intensity distribution for a set of fundamental or first harmonic vibrations for which n=1. For comparative purposes FIG. 5 illustrates an arrangement in which not all the modal energies are trapped within a 5 mm radius circle. It is preferred to employ an arrangement in which substantially all the modal energy is confined so as to avoid disturbance of the temperature/frequency response of the modes. In said circumstances a steeper crystal contour can be employed to reduce modal spreading.

FIG. 6 illustrates the amplitude or intensity distribution of a corresponding set of third harmonic (n=3) vibrations. As can be seen from FIG. 6 the intensity of the third harmonic modes decays rapidly to zero and thus substantially all the energy is trapped within a 5 mm radius circle.

The appropriate value (or values) of n that may be selected for any particular crystal element may be determined according to the crystal construction. For example, if the crystal has a steep contour so that the fundamental vibration is trapped within e.f. a 5 mm diameter circle then there is the possibility of coupling between the third harmonic vibration and the flexual modes of the crystal. In such circumstances it would be appropriate to select vibrational modes for which n=1. On the other hand, if the crystal has a shallow contour with consequent spreading of the fundamental vibrations then it would be more appropriate to select higher order modes e.g. for which n=3.

It will thus be appreciated that, for a particular crystal construction, it will be possible to select two inharmonic vibrations of the same appropriate modal order and which are of similar but not identical frequency.

Figure 7:
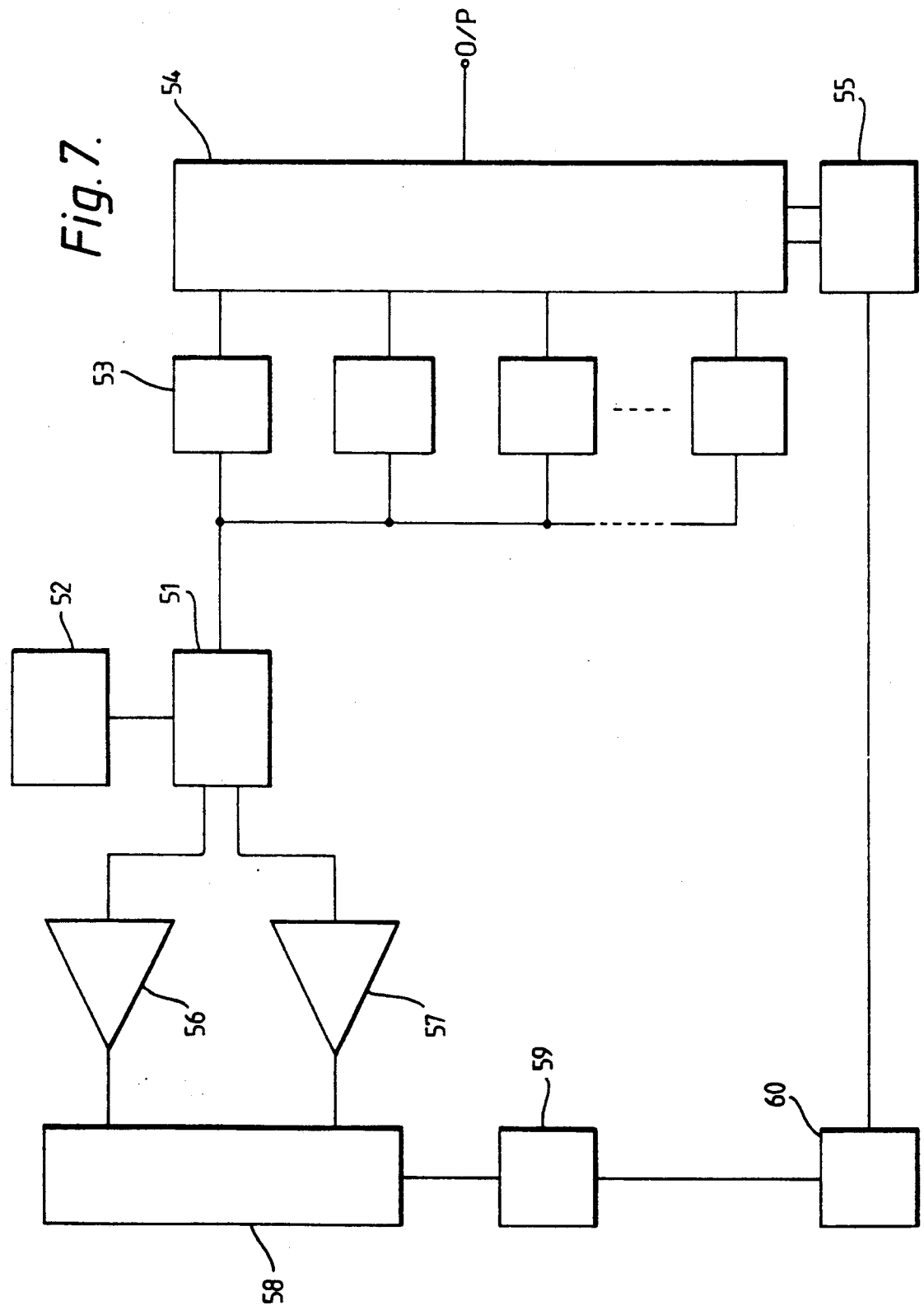
FIG. 7 shows a frequency synthesiser circuit incorporating a crystal resonator and provided with temperature control of the output frequency.

Referring now to FIG. 7, there is shown a schematic diagram of a frequency synthesiser incorporating a temperature controlled crystal oscillator. It will be appreciated that this circuit is described by way of example only and is not specific to the particular crystal constructions detailed above.

The synthesiser includes a reference piezo-electric resonator 51 driven by associated oscillator circuits 52 and one of whose output is fed to frequency divider circuits 53 the outputs of which are mixed via mixer 54. A control circuit 55 determines the particular subdivided frequencies to be mixed at any instant in accordance with a stored division algorithm whereby to provide the desired synthesised output frequency.

The output frequency of the synthesiser is provided with temperature compensation in the following manner. Signals corresponding to the two inharmonics are fed to respective first and second amplifiers 56, 57, the outputs of which are coupled to a mixer circuit 58. The mixer combines the two amplified signals to obtain a beat frequency corresponding to the frequency difference between the two inharmonics. As the frequency difference between the inharmonics is relatively small, this beat frequency is comparatively low.

The output of the mixer is fed via a low pass filter 59, which removes the high frequency sum of the inharmonics to a frequency meter circuit 60. Nore that one of the original frequencies may be used as the reference for the frequency meter. The circuit 60 provides a frequency, and hence temperature, responsive signal to the control circuit 55 which in response to this input adjusts the division algorithm to compensate for the change in oscillator frequency so as to maintain the output synthesised frequency at a constant value.

It will be appreciated that in other applications the frequency difference signal corresponding to temperature may be employed in a feedback signal to maintain the resonator at a constant temperature and thus at a constant frequency. Alternatively, the arrangement may be used as a thermometer.

We claim:

1. A method of determining the temperature of a crystal resonator comprising a lenticular quartz body, the method comprising providing a plurality of electrodes on said body, generating via said electrodes first and second harmonics of respective first and second C-mode fundamental vibrations, said first and second harmonics being mutually inharmonically related, of similar frequency and of the same overtone order, and comparing said first and second harmonics whereby to derive a signal indicative of the oscillator temperature, wherein each said harmonic fundamental vibration is a shear mode harmonic vibration characterised as an (n, a, b) vibration where n is the overtone number and is equal to the number of nodes along a first direction, a is the number of anti-nodes along a second direction perpendicular to the first direction, and b is the number of anti-nodes along a third direction perpendicular to said first and second direction.

2. A method as claimed in claim 1, wherein said first and second harmonics comprise respectively an (n, 1, 1) overtone and an (n, 1, 2) overtone.

3. A method as claimed in claim 1, wherein said first and second harmonics comprise respectively an (n, 2, 1) overtone and an (n, 2, 2) overtone.

4. A method as claimed in claim 1, wherein the crystal cut is selected from the group consisting of the SC, AT or BT cuts.

5. A method as claimed in claim 2, wherein said first and second harmonics are third harmonics for which n is equal to 3.

6. A method as claimed in claim 3, wherein said first and second harmonics are third harmonics for which n is equal to 3.

* * * * *